US008358848B2

(12) United States Patent
Sato

(10) Patent No.: US 8,358,848 B2
(45) Date of Patent: Jan. 22, 2013

(54) IMAGE RECOGNITION DEVICE, COPY APPARATUS AND IMAGE RECOGNITION METHOD

(75) Inventor: Yuji Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1493 days.

(21) Appl. No.: 11/858,661

(22) Filed: Sep. 20, 2007

(65) Prior Publication Data

US 2008/0075369 A1 Mar. 27, 2008

(30) Foreign Application Priority Data

Sep. 27, 2006 (JP) ................................. 2006-263112

(51) Int. Cl.
*G06K 9/46* (2006.01)
(52) U.S. Cl. ........ 382/195; 382/181; 382/190; 382/205; 382/209; 382/216; 399/366
(58) Field of Classification Search .................. 382/100, 382/112, 181, 190, 195, 203, 205, 206, 209, 382/216–218; 399/366
See application file for complete search history.

(56) References Cited

U.S. PATENT DOCUMENTS

| 5,367,578 | A | * | 11/1994 | Golem et al. | 382/183 |
|---|---|---|---|---|---|
| 5,533,144 | A | * | 7/1996 | Fan | 382/135 |
| 5,678,155 | A | * | 10/1997 | Miyaza | 399/366 |
| 5,751,854 | A | * | 5/1998 | Saitoh et al. | 382/218 |
| 5,790,165 | A | * | 8/1998 | Kuboki et al. | 358/296 |
| 6,188,787 | B1 | * | 2/2001 | Ohmae et al. | 382/165 |
| 6,298,150 | B1 | * | 10/2001 | Sonoda et al. | 382/162 |
| 6,473,521 | B1 | * | 10/2002 | Hino | 382/164 |
| 6,546,151 | B1 | * | 4/2003 | Araki et al. | 382/282 |
| 6,556,311 | B1 | * | 4/2003 | Benear et al. | 358/1.9 |
| 6,989,839 | B2 | * | 1/2006 | Braun et al. | 382/162 |
| 7,412,089 | B2 | * | 8/2008 | Squires et al. | 382/141 |
| 7,575,171 | B2 | * | 8/2009 | Lev | 382/154 |
| 7,715,659 | B2 | * | 5/2010 | Zhao et al. | 382/305 |
| 2004/0247169 | A1 | * | 12/2004 | Ross et al. | 382/137 |
| 2007/0041628 | A1 | * | 2/2007 | Fan | 382/135 |

FOREIGN PATENT DOCUMENTS

| JP | 05-085158 | 4/1993 |
|---|---|---|
| JP | 07-226839 | 8/1995 |
| JP | 08-263717 | 10/1996 |
| JP | 09-018709 | 1/1997 |
| JP | 09-265534 | 10/1997 |
| JP | 2000-222614 | 8/2000 |
| JP | 2001-312732 | 11/2001 |

OTHER PUBLICATIONS

Notification of Reasons for Refusal for Japanese Patent Application No. 2006-263112 mailed Jan. 25, 2011.

* cited by examiner

*Primary Examiner* — Eric Rush
(74) *Attorney, Agent, or Firm* — Banner & Witcoff, Ltd.

(57) ABSTRACT

An image recognition device of the invention includes an image reading means for reading image information from a manuscript, discriminating a specific image in which a surrounded image is surrounded by a surrounding image from the image information. The image recognition device includes a first determination means for determining whether the surrounding image is included in the image information or not and a second determination means for determining whether there is the specific image in the image information or not by extracting n×n images to be processed by dividing an extraction region positioned at the center of the surrounding image into n×n regions ("n" is an odd-number of three or more) when the first determination means determines that the surrounding image is included in the image information, then, by checking respective images to be processed with a specific image template.

9 Claims, 13 Drawing Sheets

IMAGE RECOGNITION DEVICE, COPY APPARATUS AND IMAGE RECOGNITION METHOD

CROSS-REFERENCE TO RELATED APPLICATION

The present application alleges benefits related to Japanese Patent Application JP2006-263112 filed in the Japanese Patent Office on Sep. 27, 2006, the contents of which being incorporated herein by reference.

BACKGROUND OF THE INVENTION

The invention relates to an image recognition device, a copy apparatus and an image recognition method.

A conventional image recognition device is disclosed in JP-A-7-226839. The image recognition device includes an image reading means for reading image information from a manuscript, discriminating a specific image in which a surrounded image is surrounded by a surrounding image from the image information.

In more detail, the image recognition device divides an extraction region at an optional position in image information into four regions and extracts four images to be processed, then, determines whether there is a specific image in the image information or not by checking respective images to be processed and a specific image template.

The image recognition device having the above configuration is mounted on, for example, a copy apparatus including a printing means for performing printing based on image information. The image recognition device can take illegal copy prevention measures such as stopping printing processing after that when determining that there is a specific mark in image information. Accordingly, the image recognition device can discriminate the specific mark included in a manuscript such as a banknote or a classified document to prevent illegal copying.

In order to prevent the copy apparatus from being misused for illegal copying of a banknote or a classified document, it is necessary to maintain determination accuracy of the image recognition device and it is required that time necessary for the determination is shortened.

BRIEF SUMMARY OF THE INVENTION

The invention has been made in view of the above conventional conditions, and an object thereof is to provide an image recognition device which is capable of improving processing speed of image recognition.

In order to achieve the above object, the inventor performed analyses in detail of the conventional image recognition device and found problems below.

Specifically, a specific mark such as a seal impression printed on a manuscript such as a banknote of a classified document generally includes a surrounding pattern having circular shape, polygonal shape and the like, and a surrounded pattern to be surrounded by the surrounding pattern. The surrounded pattern has a complicated shape as compared with the surrounding pattern, including characteristic patterns in many cases. Image information obtained as a result that such specific mark is read by the image reading means includes a surrounding image corresponding to the surrounding pattern and a surrounded image corresponding to the surrounded pattern.

That is, image information includes the specific image corresponding to the specific mark.

The conventional image recognition device divides an extraction region at an optional position in image information into four regions and extracts four images to be processed.

Accordingly, a center portion of the surrounded image which is likely to include a characteristic pattern is divided by respective regions to be processed, therefore, when respective regions to be processed including divided surrounded images are checked with the specific image template, a problem that determination accuracy is reduced often occurs.

In the case that the extraction region is not divided and one image to be processed is extracted, information amount in the region to be processed drastically increases and a problem that processing speed of image recognition is drastically reduced often occurs.

In order to solve the above problem, an inventor devoted himself to study and reached the present invention.

An image recognition device of the invention is an image recognition device including an image reading means for reading image information from a manuscript, and discriminating a specific image in which a surrounded image is surrounded by a surrounding image from the image information. The image recognition device includes a first determination means for determining whether the surrounding image is included in the image information or not and a second determination means for determining whether there is the specific image in the image information or not by extracting n×n images to be processed by dividing an extraction region positioned at the center of the surrounding image into n×n regions ("n" is an odd-number of three or more) when the first determination means determines that the surrounding image is included in the image information, then, by checking respective images to be processed with a specific image template.

In the image recognition device having the above configuration, since the determination has two stages in which the first determination means makes a guess, then, the second determination means performs closer discrimination processing, processing speed can be improved. In addition, the image recognition device divides the extraction region into n×n regions ("n" is an odd-number of three or more), therefore, the surrounded image which is likely to include a characteristic pattern is difficult to be divided. Moreover, the image to be processed positioned at the center in the surrounding image has the highest probability to include the characteristic pattern. Therefore, the image recognition device can improve determination accuracy by focusing attention on the image to be processed at the center.

Therefore, the image recognition device of the invention is capable of improving processing speed of image recognition as well as capable of improving determination accuracy.

BRIEF DESCRIPTION OF THE DRAWINGS

Hereinafter, embodiments in which the present invention is embodied will be explained with reference to the drawings.

DETAILED DESCRIPTION OF THE PREFERRED EMBODIMENTS

Figure 1:
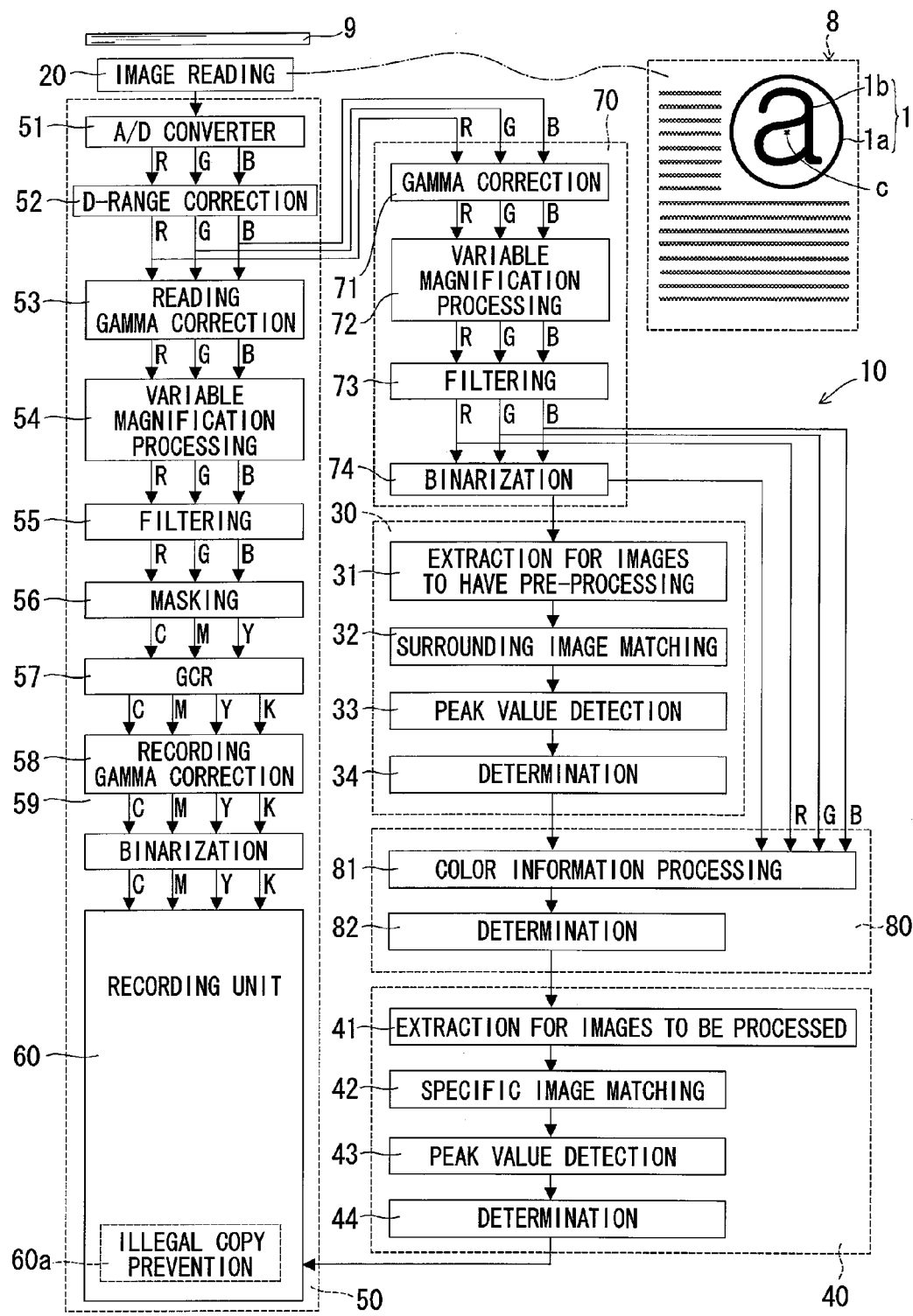
FIG. 1 is an explanatory diagram showing a configuration of an image recognition device according to an embodiment.

As shown in FIG. 1, an image recognition device 10 according to an embodiment is mounted on a copy apparatus (not shown) such as a printer, a copy machine, a FAX and the like. The image recognition device 10 includes an image reading means 20 for reading image information 8 from a manuscript 9 and a first image processing means 50 for correcting the image information 8 so as to correspond to a reading characteristic of the image reading means 20, an output characteristic of a copy apparatus, or an output form such as an output size or a variable magnification rate of copying designated by a user.

The image recognition device 10 includes a second image processing means 70, a first determination means 30, a second determination means 40 and a third determination means 80. The second image processing means 70, the first determination means 30, the second determination means 40 and the third determination means 80 discriminate whether there is a specific image 1 in the image information 8 or not by a later-described procedure in stages.

The specific image 1 corresponds to a specific mark such as a seal impression printed on the manuscript 9 such as a banknote or a classified document. In the embodiment, the specific mark includes a surrounding pattern having a circular shape and a character "a" as a surrounded pattern to be surrounded by the surrounding pattern. When the specific mark is printed on the manuscript 9, the image information 8 includes a circular-shaped surrounding image 1a corresponding to the surrounding pattern and a surrounded image 1b having the shape of the character "a" corresponding to the surrounded pattern.

Hereinafter, configurations of the image reading means 20, the first image processing means 50, the second image processing means 70, the first determination means 30, the second determination means 40 and the third determination means 80 will be explained in more detail.

(Image Reading Means)

The image reading means 20 is a scanner reading the manuscript 9 in a main-scanning direction as well as reading image information 8 of the manuscript 9 which relatively moves in a sub-scanning direction. The image reading means 20 may have any configuration as long as the means is capable of reading the image information 8 from the manuscript 9.

(First Image Processing Means)

The first image processing means 50 is provided in the downstream of the image reading means 20, including, in order from the upstream, an A/D converter 51, a D-range correction unit 52, a reading gamma correction unit 53, a variable magnification processing unit 54, a filtering unit 55, a masking unit 56, a GCR unit 57, a recording gamma correction unit 58, a binarization unit 59 and a recording unit 60.

The first image processing means 50 is not limited to the above configuration.

The A/D converter 51 converts the image information 8 read by the image reading means 20 from analog signals to digital data. At this time, the signals are converted into digital data by dividing data into RGB (R: red, G: green, B: blue).

The D-range correction unit 52 corrects the unevenness of luminance of a light source included in the image reading means 20 or the unevenness of dynamic ranges according to pixels occurring from the unevenness of sensitivity of a sensor.

The reading gamma correction unit 53 corrects contrast linearity of the image reading means 20.

The variable magnification processing unit 54 performs variable magnification processing which enlarges or reduces the image information 8 in order to adjust the difference between resolutions of the image reading means 20 and the recording unit 60 or in order to allow the variable magnification rate of copying to be a rate designated by the user.

The filtering unit 55 performs smoothing filtering processing for removing noise of the image information 8 or enhanced filtering processing for improving accuracy of characters.

The masking unit 56 converts the difference of color spaces between the image reading means 20 and the recording unit 60 (converting from RGB into CMY (C: cyan, M: magenta, Y: yellow). Recently, a method using a three-dimensional lookup table is commonly used.

The GCR unit 57 generates a black component from input CMY as well as removes the black component from CMY. Namely, CMY data is converted into CMYK (K: black) data.

The recording gamma correcting unit 58 corrects density linearity because of dot gain and the like of the recording unit 60.

The binarization unit 59 converts data into binary data which can be recorded in the recording unit 60 by an error diffusion method or a dither method.

The recording unit 60 records the image information 8 which has been corrected by the above A/D converter 51, the D-range correction unit 52, the reading gamma correction unit 53, the variable magnification processing unit 54, the filtering unit 55, the masking unit 56, the GCR unit 57, the recording gamma correction unit 58, and the binarization unit 59, and outputs the image information 8 to the copy apparatus and the like. The recording unit 60 includes an illegal copy prevention unit 60a performing illegal copy prevention measures such as stopping output of the image information 8 to the outside, when it is determined that there is the specific image 1 in the image information 8.

(Second Image Processing Means)

The second image processing means 70 is provided in the downstream of the position of the D-range correction unit 52 of the first image processing means 50 and parallel to the position from the reading gamma correction unit 53 until the recording unit 60 in the first image processing means 50. The second image processing means 70 includes, in order from the upstream, a gamma correction unit 71, a variable magnification processing unit 72, a filtering unit 73, and a binarization unit 74.

The gamma correction unit 71 receives image information 8 in which dynamic ranges have been corrected by the A/D converter 51 and the D-range correction unit 52 in the first image processing means 50. The gamma correction unit 71 corrects contrast linearity of the reading means 20 so as to be suitable for discrimination processing of the specific image 1.

Particularly, dark portions and highlight portions are not necessary for discrimination processing of the specific image 1, therefore, a high-contrast tone curve is used.

The magnification processing unit 72 performs variable magnification processing from the resolution of the reading means 20 to the resolution suitable for discrimination processing of the specific image 1. The variable magnification rate at this time does not depend on the variable magnification rate of copying designated by the user.

The filtering unit 73 performs filtering processing for removing noise of the image information 8 and for improving accuracy of characters. In the embodiment, since edge information is not used to discrimination processing of the specific image 1, the smoothing filtering processing for removing noise is performed with respect to the image information 8.

The binarization unit 74 performs binarization according to luminance of an input RGB value. The conversion to luminance is not a common conversion but weighting attaching importance to a color which is often used for the specific mark is performed. Specifically, for example, the common luminance conversion is Luminance=$0.30 \times R + 0.59 \times G + 0.11 \times B$, whereas, the luminance conversion in the embodiment is Luminance=$0.10 \times R + 0.50 \times G + 0.40 \times B$.

(First Determination Means)

The first determination means 30 is provided in the downstream of the second image processing means 70. The first determination means 30 includes, in order from the upstream, an extraction unit for images to have pre-processing 31, a surrounding image matching unit 32, a peak value detecting unit 33 and a determination unit 34.

Figure 2A:
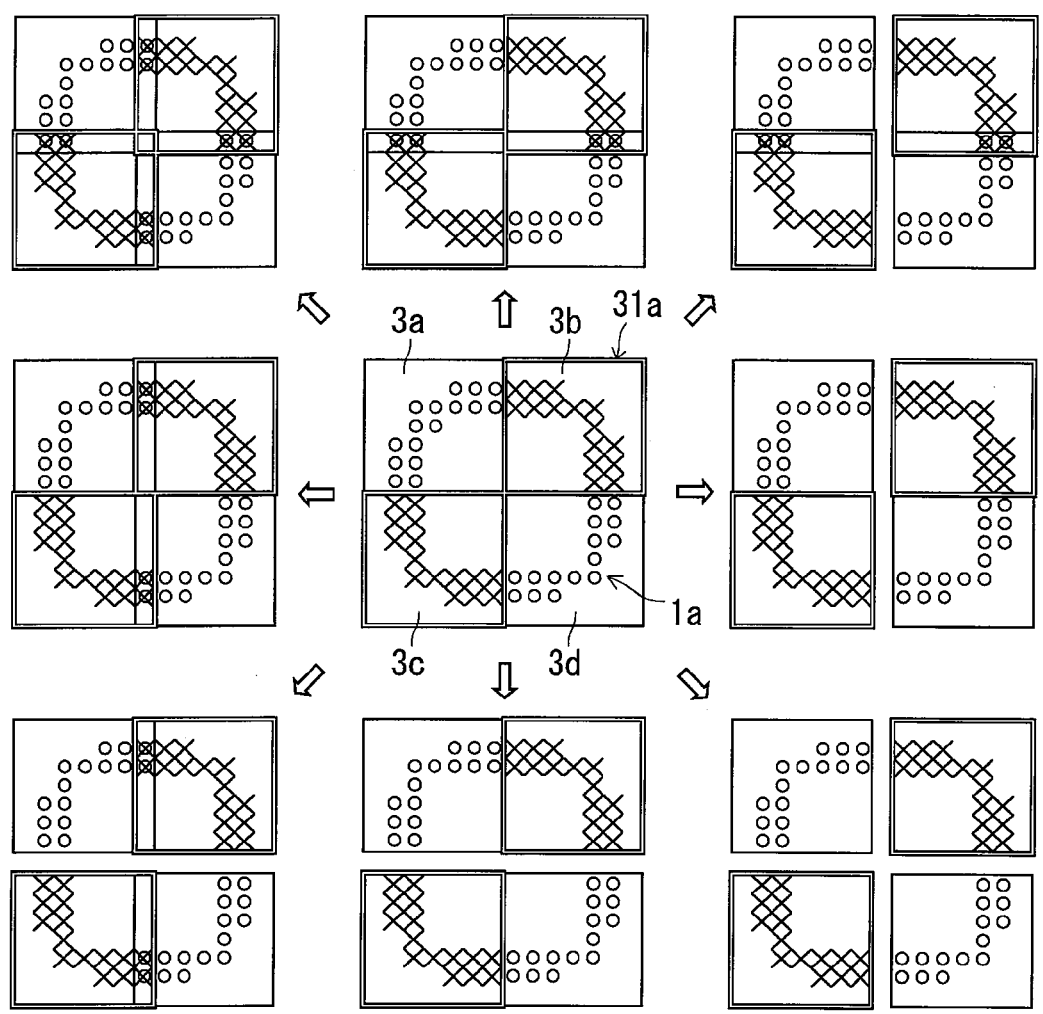
FIG. 2A to FIG. 2C relate to the image recognition device according to the embodiment, which are explanatory views showing a processing method by an extraction unit for images to have pre-processing and a surrounding image matching unit in a first determination means.

The extraction unit for images to have pre-processing 31 divides a pre-extraction region 31a into 2×2 regions at an optional position in the image information 8 and extracts four images to have pre-processing 3a, 3b, 3c and 3d as shown in the center of FIG. 2A.

The pre-extraction region 31a is a square. Accordingly, since respective images to have pre-processing 3a, 3b, 3c and 3d can be squares having the same size, discrimination processing routine can be shared and simplified. As shown in FIG. 2C, an extraction region 41a which is described later is selected to have a smaller area than the pre-extraction region 31a. The reason why the extraction region 41a is made smaller than the pre-extraction region 31a is that information of peripheral edges of images to have pre-processing 3a, 3b, 3c and 3d is not necessary for discrimination processing for images to be processed 4a, 4b, 4c, 4d, 4e, 4f, 4g, 4h and 4i which are obtained by dividing the extraction region 41a into 3×3 regions. In addition, the images to have pre-processing 3a, 3b, 3c and 3d are selected to have larger areas than images to be processed 4a, 4b, 4c, 4d, 4e, 4f, 4g, 4h and 4i which will be described later. This is because, since the first determination means 30 generally has a smaller load than the second determination means 40 at the time of discrimination processing, processing speed can be further improved by allowing the images to have pre-processing 3a, 3b, 3c and 3d which are dealt with by the first determination means 30 to be large processing units.

Figure 2B:
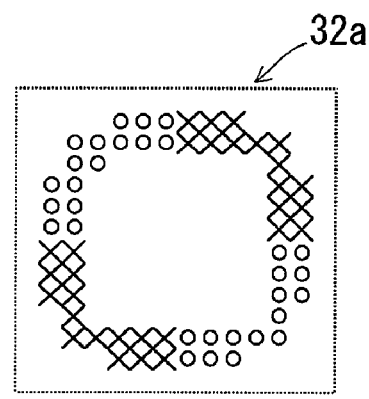
Figure 2C:
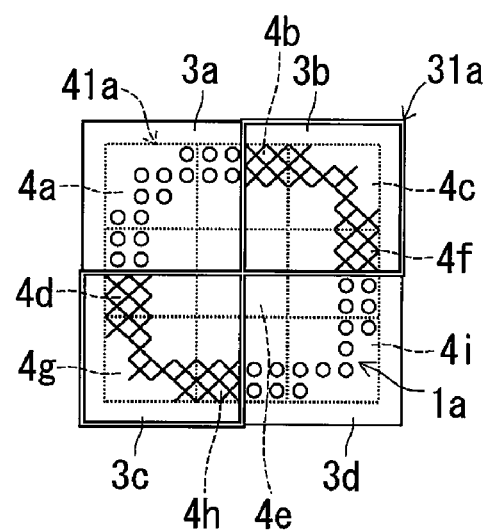

The surrounding image matching unit 32 checks respective images to have pre-processing 3a, 3b, 3c and 3d with a surrounding image template 32a shown in FIG. 2B, finding correlation coefficients to calculate similarities. At this time, relative distances in X-direction and Y-direction of respective images to have pre-processing 3a, 3b, 3c and 3d shown in the center of FIG. 2A are allowed to vary in a pixel unit to make eight ways of combination shown in surrounding positions of FIG. 2A, and correlation coefficients of respective images to have pre-processing 3a, 3b, 3c and 3d are added according to total nine ways of combination. Then, the largest value among them is the similarity in the pre-extraction region 31a. When the relative distance between respective images to have pre-processing 3a, 3b, 3c and 3d is an odd-number, there are fractions at coordinates of the center point, however, fractions are rounded down or rounded up to be the same point.

In the surrounding image matching unit 32, combination of relative positions of respective images to have pre-processing 3a, 3b, 3c and 3d in X-direction and Y-direction is not limited to nine ways, however, it is also preferable that the relative distance is allowed to vary more closely to have 25 ways of combination, for example. Though both "O" and "x" in FIG. 2A and FIG. 2B should be "●" corresponding to a pixel unit, they are changed for convenience in order to discriminate overlapped states.

The peak value detecting unit 33 detects a similarity which becomes peak value locally at more than a fixed value in similarities calculated by closely moving the pre-extraction region 31a in the image information 8. When the similarity which becomes peak value locally at more than the fixed value is detected at this time, it is found that the surrounding image 1a is included in the image information 8, and a position where the similarity has been calculated is determined as a center "C" of the surrounding image 1a as shown in FIG. 1. On the other hand, if the similarity to be more than a fixed value is not detected, it is found that the surrounding image 1a is not included in the image information 8.

The determination unit 34, when determining that the surrounding image 1a is included in the image information 8 based on the result of the peak value detecting unit 33, transmits the determination result, namely, information that there can be the specific image 1 to the third determination means 80 and the second determination means 40.

Accordingly, the first determination means 30 can determine whether the surrounding image 1a is included in the image information 8 or not.

(Third Determination Means)

The third determination means 80 is provided in the downstream of the first determination means 30, including a color information processing unit 81 and a determination unit 82.

The color information processing unit 81 processes color information of the surrounding image 1a based on input signals from the filtering unit 73 and the binarization unit 74 of the second image processing means 70. At this time, in order not to be affected by a base sheet color, an average value of only RGB values of pixels in parts determined to be high-density by the binarization unit 74, namely, parts in which ink of the printed specific mark is formed will be calculated.

The determination unit 82 determines that color information of the surrounding image 1a resembles color information of the specific mark when the average value obtained in the color information processing unit 81 is in a predetermined range, and transmits information that there can be the specific image 1 to the second determination means 40. On the other hand, the determination unit 82 determines that the color information of the surrounding image 1a does not resemble the color information of the specific mark when the average value obtained in the color information processing unit 81 is not in the predetermined range, and transmits the result that there is not the specific image 1 in the image information 8 to the second determination means 40.

According to the above, the third determination means 80 is capable of determining whether the color information of the surrounding image 1a included in the image information 8 resembles the color information of the specific mark.

(Second Determination Means)

The second determination means 40 is provided in the downstream of the third determination means 80. The second determination means 40 includes, in order from the upstream, an extraction unit for images to be processed 41, a specific image matching unit 42, a peak value detecting unit 43 and a determination unit 44.

Figure 3A:
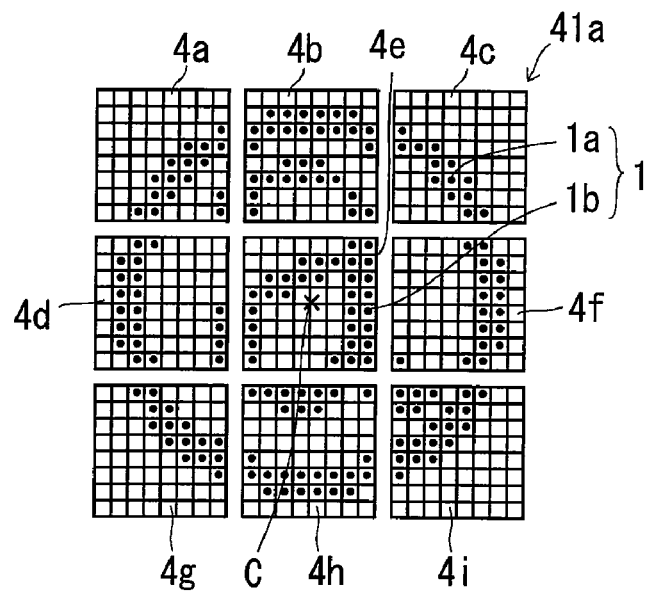
FIG. 3A to FIG. 3F relate to the image recognition device according to the embodiment, which are explanatory views showing a processing method of an extraction unit for images to be processed and a specific image matching unit in the second determination means.
Figure 3B:
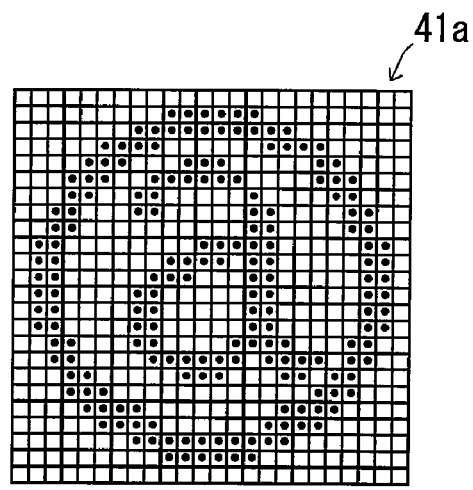

The extraction unit for images to be processed 41 divides an extraction region 41a shown in FIG. 3B into 3×3 regions taking the center "C" of the surrounding image 1a as a center as shown in FIG. 3A to extract nine images to be processed 4a, 4b, 4c, 4d, 4e, 4f, 4g, 4h and 4i.

The extraction region 41a is a square. Accordingly, since respective images to be processed 4a, 4b, 4c, 4d, 4e, 4f, 4g, 4h and 4i can be squares having the same size, discrimination processing routine can be shared and simplified.

Figure 3C:
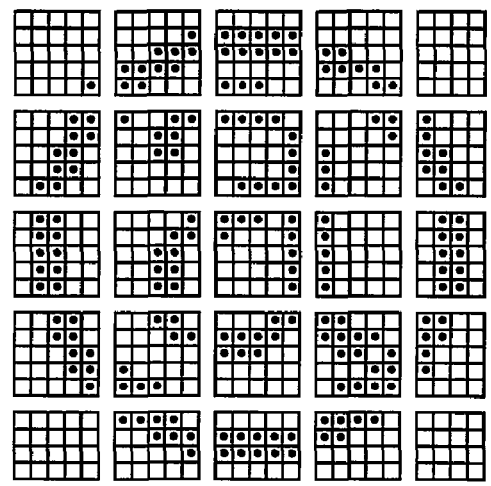

It is also preferable that the extraction unit for images to be processed 41 divides the extraction region 41a to 5×5 regions to extract 25 images to be processed as shown in FIG. 3C. However, when the dividing number of the second determination means is increased so much, complication in processing occurs, therefore, it is preferable to be divided into 3×3 regions.

Figure 3D:
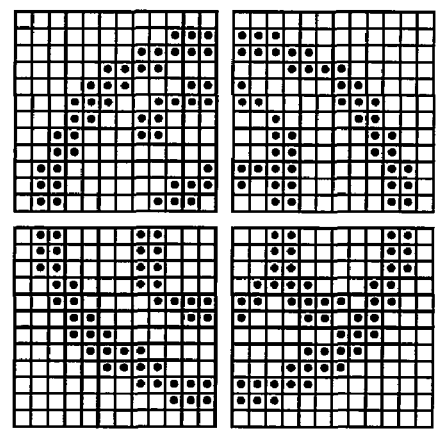
Figure 3E:
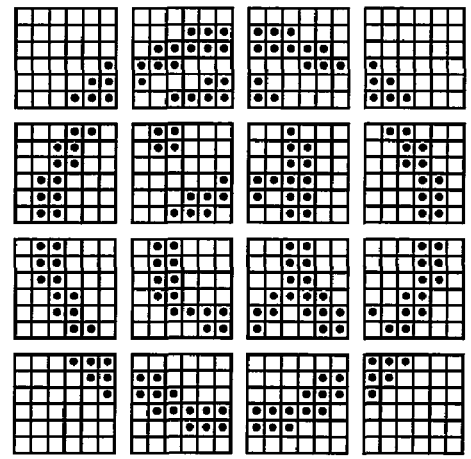
Figure 3F:
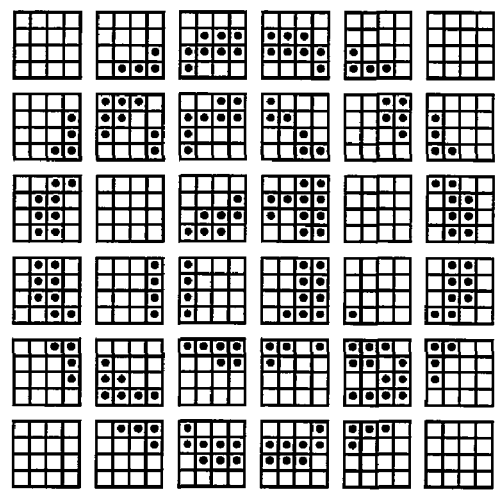
Figure 4A:
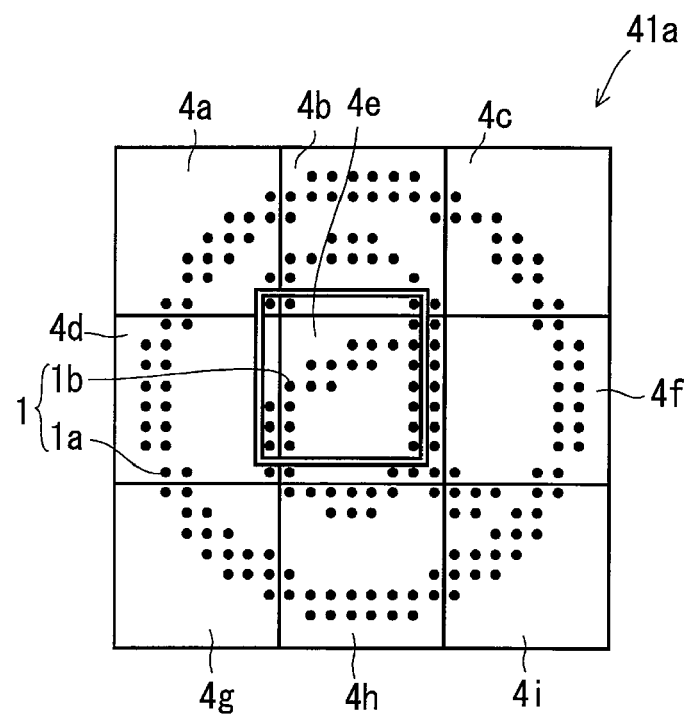
FIG. 4A to FIG. 4I relate to the image recognition device according to the embodiment, which are explanatory views showing a processing method of the specific image matching unit in the second determination means.
Figure 4B:
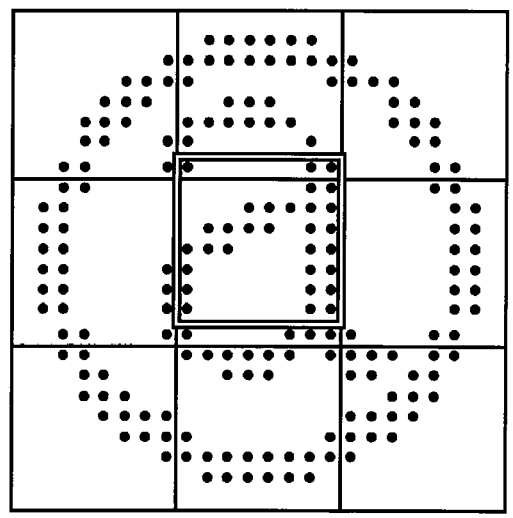
Figure 4C:
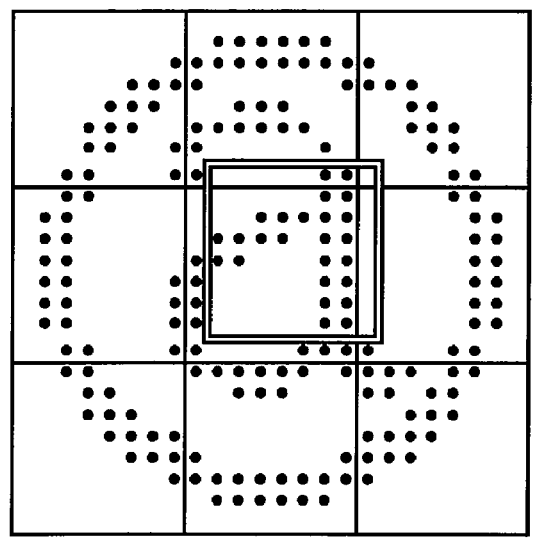
Figure 4D:
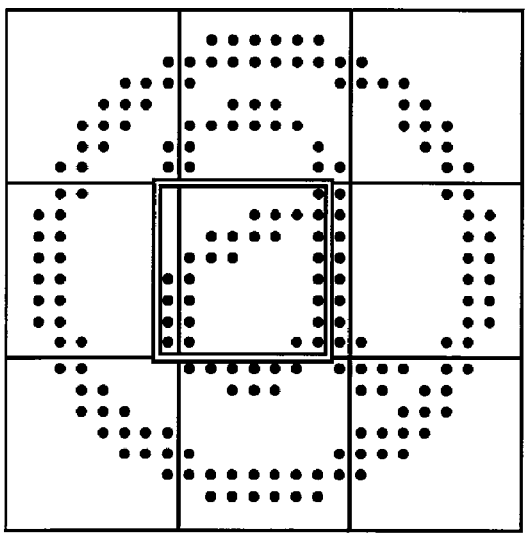
Figure 4E:
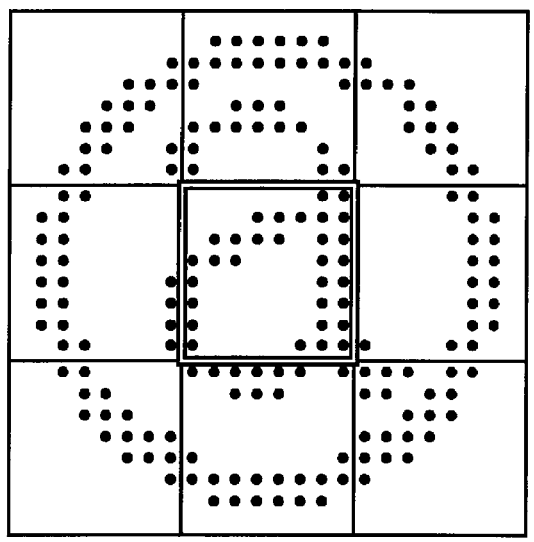
Figure 4F:
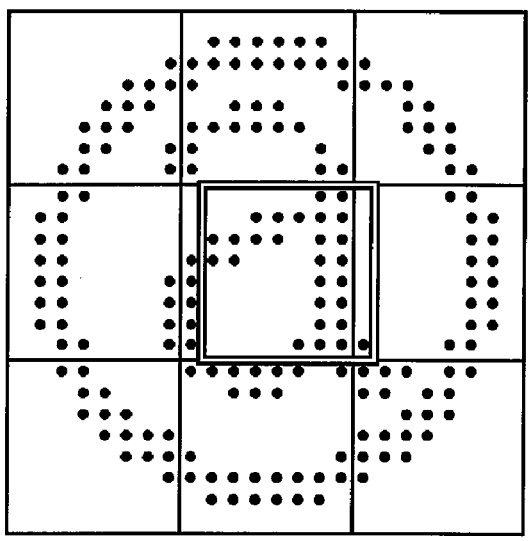
Figure 4G:
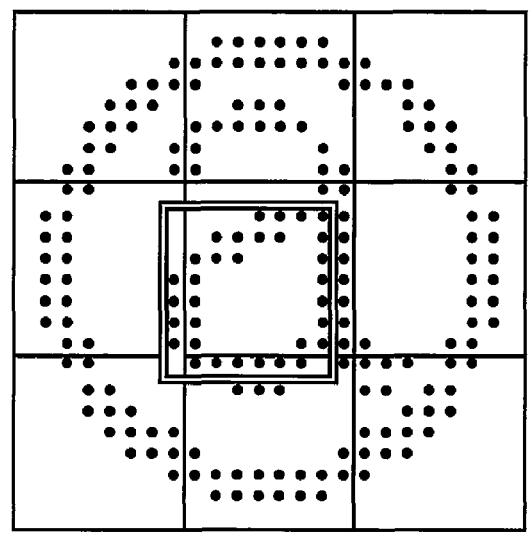
Figure 4H:
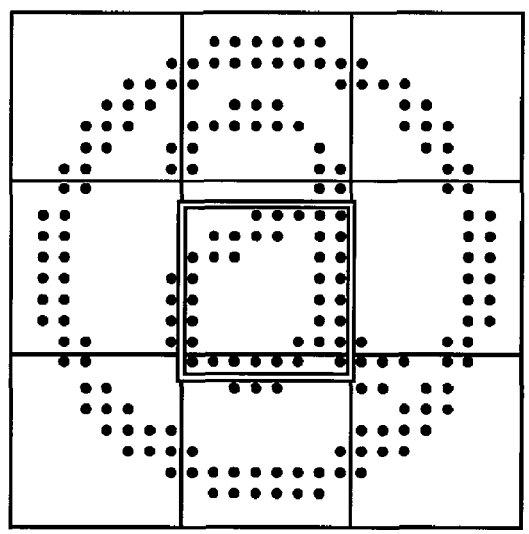
Figure 4I:
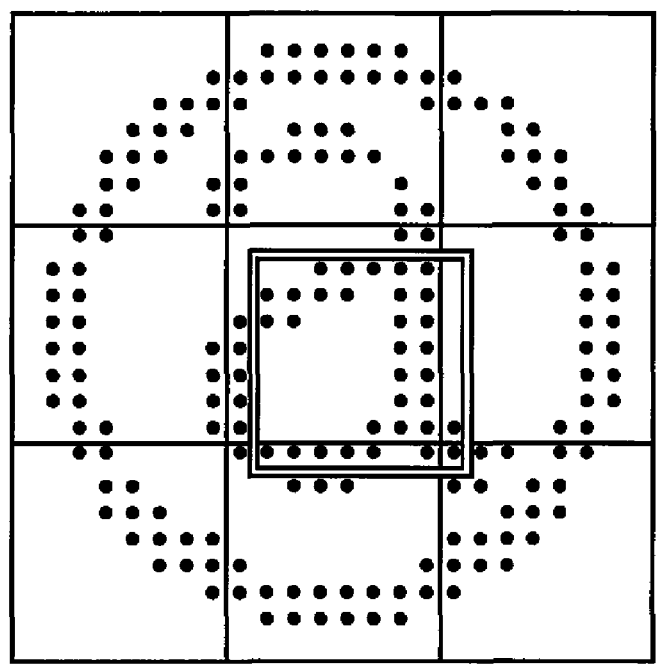

The extraction unit for images to be processed 41 does not divide the extraction region into p×p (p is an even number) as shown in FIG. 3D to FIG. 3F. Because the surrounded image 1b which is likely to include a characteristic pattern is divided by respective images to be processed, which reduce the determination accuracy.

Figure 5:
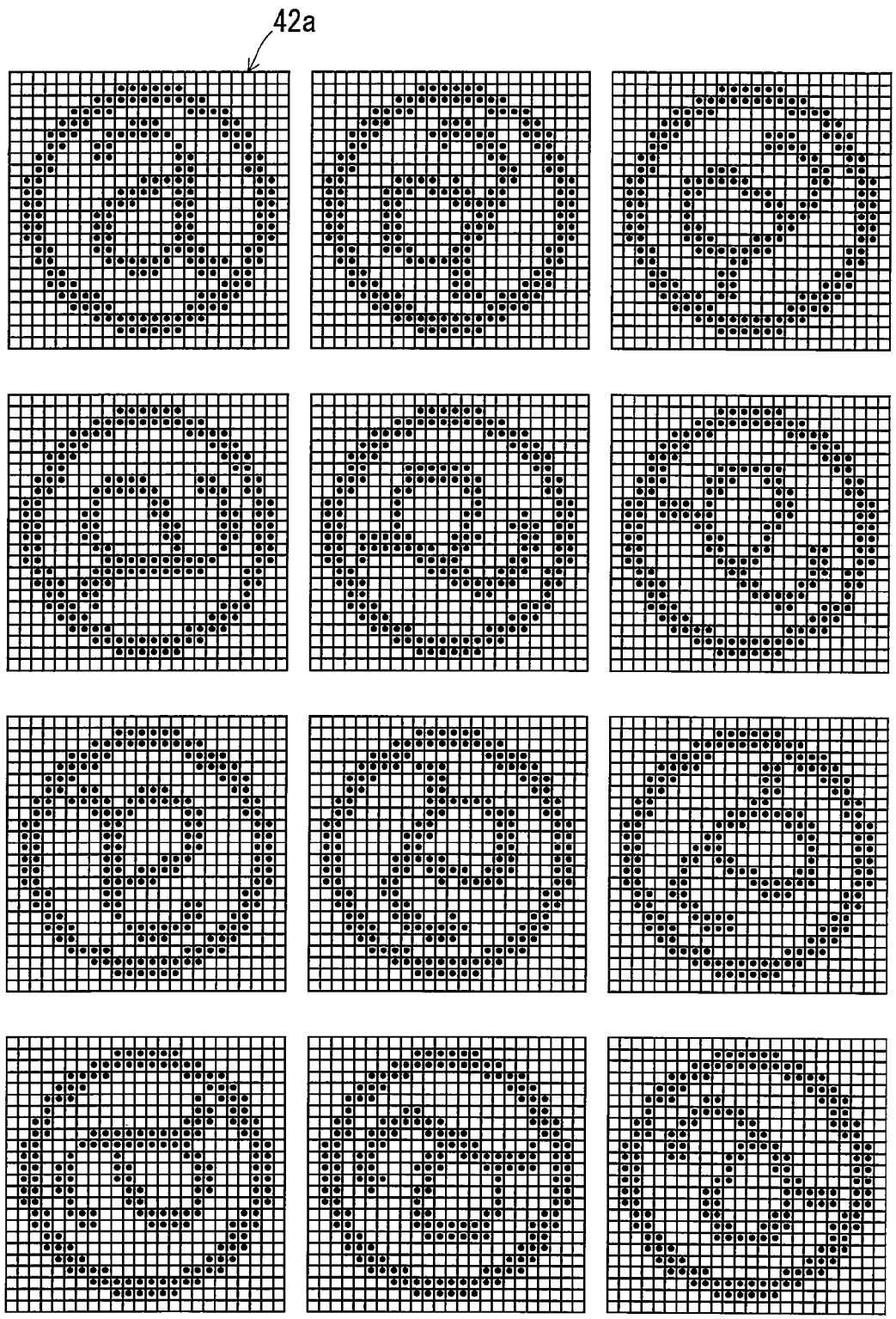
FIG. 5 relates to the image recognition device according to the embodiment, which is an explanatory view showing a processing method of the specific image matching unit in the second determination means.

The specific image matching unit 42 checks respective images to be processed 4a, 4b, 4c, 4d, 4e, 4f, 4g, 4h and 4i shown in FIG. 3A with a specific image template 42a and a group of variations shown in FIG. 5 and calculates similarities by finding correlation coefficients.

At this time, the specific image matching unit 42 checks one image to be processed 4e positioned at the center of the extraction region 41a first, next, checks other images to be processed 4a, 4b, 4c, 4d, 4f, 4g, 4h and 4i. The reason is that the image to be processed 4e having the highest probability to have the characteristic pattern is checked first, thereby stopping processing after that if determination that the image does not correspond can be performed in that stage, which can omit unnecessary processing and further improve processing speed.

The specific image matching unit 42, when checking one image to be processed 4e positioned at the center of the extraction region 41a first, checks the images while shifting the relative position between the image to be processed 4e and the specific image template 42a in X-direction and Y-direction in a pixel unit as shown by double frames of FIG. 4A to FIG. 4I. The manner of shifting may be shifted pixel-by-pixel or may be combination of more than several pixels. Accordingly, distortion or displacement of the image to be processed 4e can be absorbed. When checking other images to be processed 4a, 4b, 4c, 4d, 4f, 4g, 4h, and 4i, images are also checked while shifting positions.

The specific image matching unit 42 also checks the image to be processed 4e with the group of variations of specific image template 42a shown in FIG. 5, when checking one image to be processed 4e positioned at the center of the extraction region 41a first. The group of variations of the specific image template 42a is templates formed by rotating the specific image template 42a in order to be determined even when the specific image 1 is arranged by being rotated at an optional angle.

Figure 6:
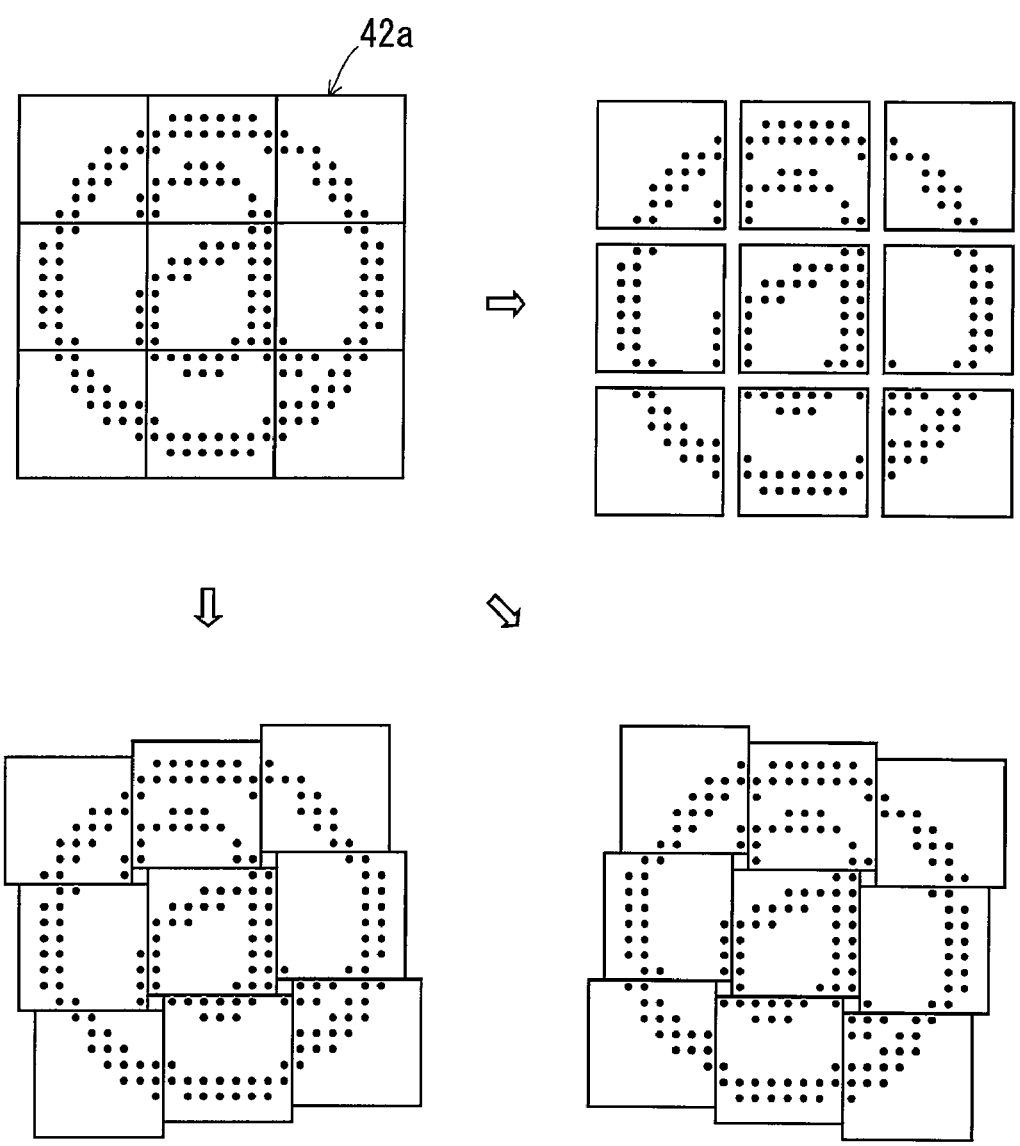
FIG. 6 relates to the image recognition device according to the embodiment, which is an explanatory view showing a processing method of the specific image matching unit in the second determination means.

In FIG. 5, the group of variations of twelve patterns in which the specific image template 42a is arranged by being rotated gradually by an angle 30 degrees, however, it is preferable that only three patterns in the highest column are prepared, and any of the three patterns in the highest column is transformed linearly concerning the remaining nine patterns. In addition, the specific image template 42a is divided into 3×3 blocks as shown in FIG. 6, and respective blocks are relatively moved in X-direction and Y-direction, thereby obtaining the same advantages as that variations of the specific image template are increased. The case can respond to the minute angle changes which cannot be responded by a pattern of the predetermined angle changes previously prepared thereby allowing the predetermined angle to be large, which reduces the number of variations of the specific image template 42a to be prepared. In this case, displacement or magnification distortion between the first determination means 30 and the second determination means 40 can be also absorbed.

Accordingly, the specific image matching unit 42 checks up the image to be processed 4e, while relatively rotating the image to be processed 4e and the specific image template 42a, as a result, the specific image matching unit 42 checks up other images to be processed 4a, 4b, 4c, 4d, 4f, 4g, 4h and 4i based on the rotation angle determined to correspond. Accordingly, it is not required to perform unnecessary rotation processing with respect to images to be processed 4a, 4b, 4c, 4d, 4f, 4g, 4h and 4i, which further improves processing speed.

As shown in FIG. 1, the peak value detecting unit 43 detects a similarity to be a peak value locally at more than a certain value among similarities calculated by the specific image matching unit 42. At this time, the similarity which becomes the peak value locally at more than the certain value is detected, it is found that there is the specific image 1 in the image information 8. On the other hand, the similarity which becomes more than the certain value is not detected, it is found that there is not the specific image 1 in the image information 8.

The determination unit 44 transmits the detected result to the illegal copy prevention unit 60a in the recording unit 60 when it has been determined that there is the specific image 1 in the image information 8 based on the result of the peak value detecting unit 43. Then, the illegal copy prevention unit 60a takes illegal copy prevention measures such as stopping output of the image information 8 to the outside.

As described above, the second determination means 40 is capable of determining whether there is the specific image 1 in the image information 8 or not.

The image recognition device 10 of the embodiment having the above configuration can output the image information 8 recorded in the recording unit 60 to the outside. For example, a copy apparatus which has received the image information 8 can perform printing based on the image information 8 by a printing means. The image recognition device 10 is also capable of discriminating the specific image 1 included in the image information 8 of the manuscript 9 such as a banknote of a classified document to prevent illegal copying.

The image recognition device 10 includes the first determination means 30 and the second determination means 40. Since the determination has two stages in which the first determination means 30 makes a guess, then, the second determination means 40 performs closer discrimination processing, processing speed can be improved. In addition, the image recognition device 10 divides the extraction region 41a into 3×3 regions, therefore, the surrounded image 1b which is likely to include the characteristic pattern is difficult to be divided. Moreover, the image to be processed 4e positioned at the center "C" in the surrounding image 1a has the highest probability to include the characteristic pattern. Therefore, the image recognition device 10 can improve determination accuracy by focusing attention on the image to be processed 4e at the center.

Accordingly, the image recognition device 10 of the embodiment can improve processing speed of the image recognition as well as can improve the determination accuracy.

Also in the image recognition device 10, the images to have pre-processing 3a, 3b, 3c and 3d have larger areas than the images to be processed 4a, 4b, 4c, 4d, 4e, 4f, 4g, 4h, and 4i. The images to have pre-processing 3a, 3b, 3c and 3d which are dealt with by the first determination means 30 are allowed to be larger processing units, thereby further improving processing speed.

Furthermore, in the image recognition device 10, since the first determination means 30 divides the pre-extraction region 31a into 2×2 regions and the second determination means 40 divides the extraction region 41a into 3×3 regions, therefore, the determination accuracy can be improved while suppressing complication of processing.

In the image recognition device 10, since the first determination means 30 and the second determination means 40 perform determination by using the peak value of similarities, misleading information is excluded in the discrimination processing and the determination accuracy can be improved.

Additionally, the image recognition device 10 performs determination of colors by the third determination means 80 in parallel with the discrimination processing by the first determination means 30, thereby further improving the determination accuracy.

Also in the image recognition device 10, the second determination means 40 determines the image to be processed 4e at the center first, which has the highest probability to have the characteristic pattern, and if determination that the image does not correspond can be performed in that stage, processing after that can be stopped, therefore, unnecessary processing can be omitted and processing speed can be further improved.

Furthermore, as a result that the image recognition device 10 checks up the image to be processed 4e at the center, the image recognition device 10 checks up other images to be processed 4a, 4b, 4c, 4d, 4f, 4g, 4h and 4i based on the rotation angle determined to be correspond, therefore, it is not required to perform unnecessary rotation processing with respect to other images to be processed 4a, 4b, 4c, 4d, 4f, 4g, 4h and 4i, thereby further improving processing speed.

The image recognition device 10 performs the smoothing processing to the image information 8 in advance, therefore, the specific image 1 in which the noise is removed by receiving the smoothing processing can be discriminated, which improves the determination accuracy.

As described above, the invention has been explained according to the embodiment, and it goes without saying that the invention is not limited to the above embodiment and can be applied by being modified within a scope not departing from the gist thereof.

The invention can be applied to the image recognition device.

What is claimed is:

1. An image recognition device comprising:
 a processor;
 a memory storing computer executable instructions that, when executed, cause the image recognition device to function as:
  a first determination unit configured to determine whether a surrounding image is included in image information read from a document, wherein the surrounding image is part of a specific image in which the surrounding image surrounds a surrounded image; and
  a second determination unit configured to determine whether the specific image is included in the image information,
  wherein the second determination unit is configured to divide an extraction region positioned at a center of the surrounding image into N×N regions, wherein N is an odd-number of three or more, and to extract N×N images to be processed,
  wherein the second determination unit determines whether the specific image is included in the image information by checking N×N images to be processed with a specific image template once the first determination unit has determined the surrounding image is included in the image information;
 a first image processing means provided downstream of a reading means, including, in order from upstream to downstream, an A/D converter, a D-range correction unit, a reading gamma correction unit, a variable magnification processing unit, a filtering unit, a masking unit, a GCR unit, a recording gamma correction unit, a binarization unit, and a recording unit; and
 a second image processing means provided downstream of the position of the D-range correction unit of the first image processing means and parallel to a position from the reading gamma correction unit to the recording unit in the first image processing means, the second image processing means including, in order from upstream to downstream, a gamma correction unit, a variable magnification processing unit, a filtering unit, and a binarization unit,
 wherein the binarization unit of the second image processing means is configured to perform binarization according to a luminance of input RGB values, wherein conversion to luminance is performed by weighting, including attaching importance to, a color which is used for a specific mark corresponding to the specific image.

2. The image recognition device according to claim 1, wherein the first determination unit divides a pre-extraction region into 2×2 regions and extracts four images for pre-processing, and
 wherein the second determination unit divides the extraction region into 3×3 regions and extracts nine images to be processed.

3. The image recognition device according to claim 1, wherein the first determination unit determines whether the surrounding image is included in the image information by using a peak value of similarity obtained by checking images extracted for pre-processing with a surrounding image template.

4. The image recognition device according to claim 1, wherein the second determination unit determines whether the specific image is included in the image information by using a peak value of similarity obtained by checking the images to be processed with the specific image template.

5. The image recognition device according to claim 1, wherein the computer executable instructions, when executed, further cause the image recognition device to function as:
 a third determination unit for determining a color of the specific image when the first determination unit determines that the surrounding image is included in the image information.

6. The image recognition device according to claim 1,
wherein the second determination unit checks one of the images to be processed, the one of the images to be processed being positioned at a center of the extraction region, first.

7. The image recognition device according to claim 1,
wherein the image recognition device performs smoothing processing with respect to the image information in advance of determining whether the specific image is included in the image information.

8. The image recognition device according to claim 1,
wherein a pre-extraction region, from which the first determination unit is configured to extract images for pre-processing, has a larger area than the surrounding image, and
wherein the images for pre-processing have smaller areas than the surrounding image.

9. The image recognition device according to claim 1,
wherein the first determination unit is configured to extract images to be pre-processed which have larger areas than the images to be processed from the image information, and to determine whether the surrounding image exists in the image information based on the respective extracted images to be pre-processed.

\* \* \* \* \*